United States Patent
Putcha et al.

(10) Patent No.: US 10,494,238 B2
(45) Date of Patent: Dec. 3, 2019

(54) SYSTEMS AND METHODS FOR LOADING TOTES USING HYDRAULIC LIFTS

(71) Applicant: Walmart Apollo, LLC, Bentonville, AR (US)

(72) Inventors: Sai Phaneendra Sri Harsha Viswanath Putcha, Bentonville, AR (US); Luke M. Reynolds, Long Beach, CA (US); Christian J. Munoz, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/007,719

(22) Filed: Jun. 13, 2018

(65) Prior Publication Data

US 2018/0362309 A1 Dec. 20, 2018

Related U.S. Application Data

(60) Provisional application No. 62/520,783, filed on Jun. 16, 2017.

(51) Int. Cl.
*B66F 9/04* (2006.01)
*B65G 67/20* (2006.01)
(Continued)

(52) U.S. Cl.
CPC ............... *B66F 9/04* (2013.01); *B65G 67/20* (2013.01); *G06Q 10/083* (2013.01);
(Continued)

(58) Field of Classification Search
CPC combination set(s) only.
See application file for complete search history.

(56) References Cited

U.S. PATENT DOCUMENTS 3,368,704 A * 2/1968 Pope ..................... B60P 1/4421
414/545
3,837,508 A * 9/1974 Stefanelli ................ B60P 1/003
414/510

(Continued)

FOREIGN PATENT DOCUMENTS

CN 203865611 10/2014
EP 2716591 4/2014
(Continued)

OTHER PUBLICATIONS

PCT; App. No. PCT/US2018/037002; International Search Report and Written Opinion dated Aug. 30, 2018.
(Continued)

*Primary Examiner* — Kyle O Logan
(74) *Attorney, Agent, or Firm* — Fitch, Even, Tabin & Flannery LLP

(57) ABSTRACT

In some embodiments, apparatuses and methods are provided herein useful to loading totes. In some embodiments, there is provided a system for loading totes on shelves of racks secured inside a delivery truck including: a plurality of hydraulic lifts. Each of the plurality of hydraulic lifts comprises: a hydraulic system; a top surface; a stop mechanism; and at least one lift-to-rack alignment sensor; and a control circuit configured to: access a multi-dimensional positional matrix; determine a physical location associated with a tote based at least on the multi-dimensional positional matrix and a tote identifier; determine a particular hydraulic lift of the plurality of hydraulic lifts based on the physical location; activate the stop mechanism to position the tote on the top surface of the particular hydraulic lift; and operate the hydraulic system to move the tote to a height of a shelf of a rack based on the physical location.

16 Claims, 5 Drawing Sheets

(51) Int. Cl.
  *G06Q 10/08* (2012.01)
  *G06Q 50/28* (2012.01)
  *B60P 3/00* (2006.01)
(52) U.S. Cl.
  CPC ......... *G06Q 10/0832* (2013.01); *G06Q 50/28* (2013.01); *B60P 3/007* (2013.01)

(56) References Cited

U.S. PATENT DOCUMENTS

| | | | | |
|---|---|---|---|---|
| 4,941,794 | A * | 7/1990 | Hara | B65G 67/20 104/37 |
| 5,447,407 | A | 9/1995 | Weaver | |
| 5,478,189 | A * | 12/1995 | Agtuca | B60P 1/52 414/345 |
| 6,328,525 | B1 * | 12/2001 | Greenlaw | B60P 1/02 187/244 |
| 7,695,235 | B1 | 4/2010 | Rallis | |
| 2005/0118006 | A1 * | 6/2005 | Studer | B60P 1/16 414/491 |
| 2006/0088405 | A1 | 4/2006 | Leimbach | |
| 2008/0221728 | A1 | 9/2008 | Inui | |
| 2009/0110525 | A1 * | 4/2009 | Criswell | B65G 67/08 414/507 |
| 2010/0191615 | A1 * | 7/2010 | Thomas | B61D 3/20 705/26.1 |
| 2013/0024392 | A1 * | 1/2013 | Ellis | B60P 1/02 705/333 |
| 2015/0147145 | A1 * | 5/2015 | Nowak | B60P 1/4471 414/540 |
| 2015/0336741 | A1 | 11/2015 | Ahammer | |

FOREIGN PATENT DOCUMENTS

| | | |
|---|---|---|
| JP | 2008213796 | 9/2008 |
| WO | 2012113679 | 8/2012 |

OTHER PUBLICATIONS

U.S. Appl. No. 16/367,555, filed Mar. 28, 2019, Robert J. Taylor.

* cited by examiner

400

402 — identifying the tote based on the tote identifier associated with the tote

↓

404 — identifying, based on the multi-dimensional positional matrix and the tote identifier, that the tote is to be loaded on the particular hydraulic lift

↓

406 — tilting the top surface to load the tote onto the shelf using a titling mechanism of the particular hydraulic lift

↓

408 — transmitting a control signal to one or more additional hydraulic lifts to operably couple the one or more additional hydraulic lifts with the plurality of hydraulic lifts

FIG. 4

SYSTEMS AND METHODS FOR LOADING TOTES USING HYDRAULIC LIFTS

CROSS-REFERENCE TO RELATED APPLICATION

This application claims the benefit of U.S. Provisional Application No. 62/520,783, filed Jun. 16, 2017, which is incorporated herein by reference in its entirety.

TECHNICAL FIELD

This invention relates generally to loading racks of delivery vehicles.

BACKGROUND

Generally, products are shipped from a distribution center or a retail store. As such, at a loading dock is where these products start their journey to their respective delivery destinations.

BRIEF DESCRIPTION OF THE DRAWINGS

Disclosed herein are embodiments of systems, apparatuses and methods pertaining to loading totes on shelves of racks secured inside a delivery truck using a plurality of hydraulic lifts. This description includes drawings, wherein:

FIG. 4 shows a flow diagram of an exemplary process of loading totes on shelves of racks using a plurality of hydraulic lifts in accordance with some embodiments.

Figure 1:
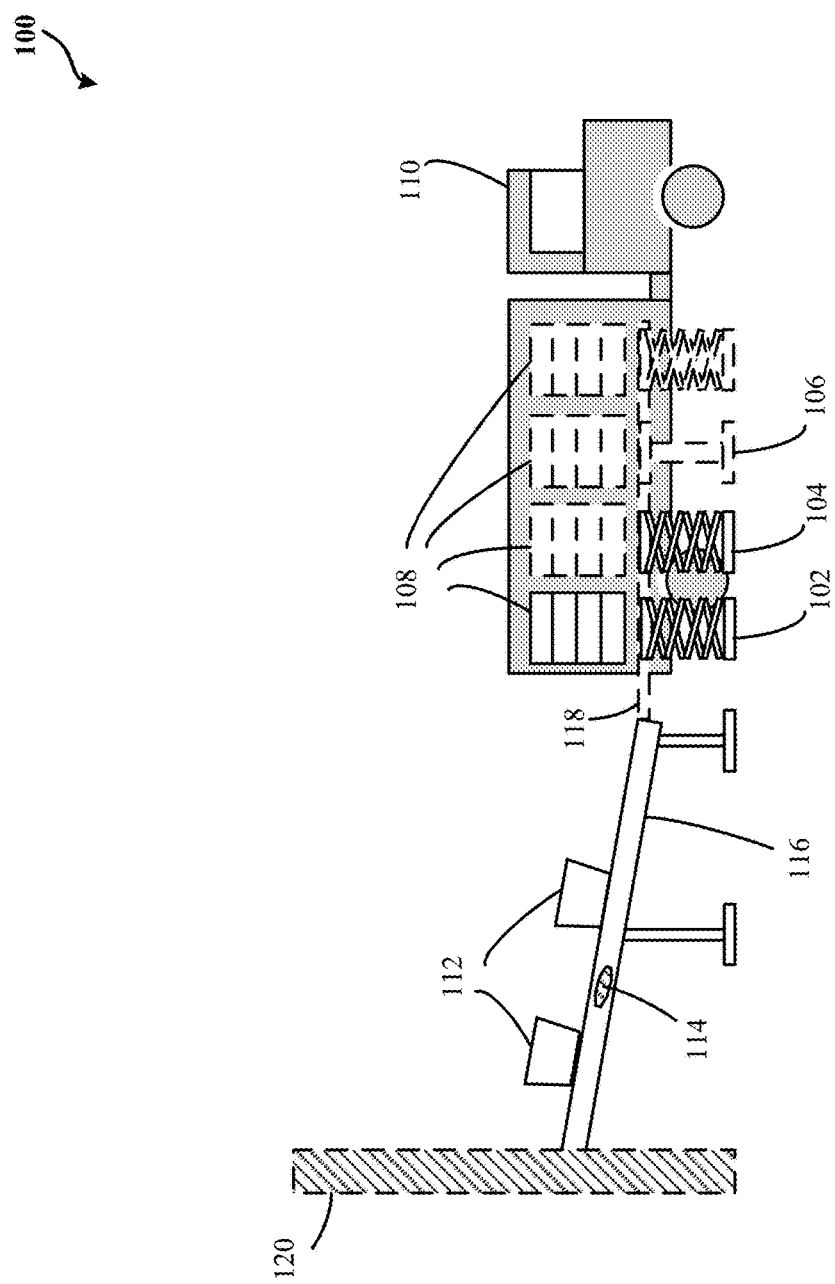
FIG. 1 illustrates a simplified schematic illustration of an exemplary system for loading totes on shelves of racks using a plurality of hydraulic lifts in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for loading totes on shelves of racks secured inside a delivery truck including a loading apparatus. The loading apparatus includes: a plurality of hydraulic lifts. Each of the plurality of hydraulic lifts may be operably coupled to and works collectively with other one of the plurality of hydraulic lifts. By one approach, each of the plurality of hydraulic lifts includes: a hydraulic system configured to move a tote of the plurality of totes relative to a rack secured inside a delivery truck. By another approach, the hydraulic lift may include a top surface coupled to the hydraulic system. In one configuration, the top surface may be adapted to provide a surface for the tote. By another approach, the hydraulic lift may include a stop mechanism to hold the tote in-place and/or stop the tote within the top surface. In one configuration, the hydraulic lift may include at least one lift-to-rack alignment sensor cooperated with at least one corresponding lift-to-rack alignment sensor of the rack to provide an indication of an alignment of the rack with the hydraulic lift.

In some embodiments, the loading apparatus may include a control circuit operably coupled with the plurality of hydraulic lifts. In one configuration, the control circuit may access a multi-dimensional positional matrix from a memory. By one approach, elements of the multi-dimensional positional matrix may correspond to predetermined physical locations of the plurality of totes within the rack. By another approach, each element of the multi-dimensional positional matrix may include a lift identifier, a rack identifier, and a shelf identifier. In another configuration, the control circuit may determine a physical location associated with the tote based at least on the multi-dimensional positional matrix and a tote identifier of the tote, In another configuration, the control circuit may determine a particular hydraulic lift of the plurality of hydraulic lifts based on the physical location. By one approach, the lift identifier of an element corresponding to the physical location is associated with the particular hydraulic lift. In yet another configuration, the control circuit may activate the stop mechanism to position the tote on the top surface of the particular hydraulic lift. In yet another configuration, the control circuit may operate the hydraulic system to move the tote to a height of a shelf of the rack based on the physical location. By one approach, the shelf identifier of the element may be associated with the shelf.

In some embodiments, a system for loading totes on shelves of racks secured inside a delivery truck may include a plurality of hydraulic lifts. By one approach, each of the plurality of hydraulic lifts may include a hydraulic system configured to move a tote of one or more totes relative to a first height of a rack secured inside a delivery truck. In one configuration, the hydraulic lift may include a top surface coupled to the hydraulic system. The top surface may be adapted to provide a surface for the tote. In another configuration, the hydraulic lift may include a stop mechanism to position the tote upon the top surface. In yet another configuration, the hydraulic lift may include at least one lift-to-rack alignment sensor cooperated with at least one corresponding lift-to-rack alignment sensor of the rack to provide an indication of an alignment of the rack with the hydraulic lift.

By another approach, the system may include a conveyor having at least one tote identifier reader. In one configuration, the conveyor may move the one or more totes towards the plurality of hydraulic lifts. By yet another approach, the system may include a control circuit coupled to the conveyor and the plurality of hydraulic lifts. In one configuration, the control circuit may identify the tote based on a tote identifier associated with the tote. For example, the tote identifier may be read by the at least one tote identifier reader while the tote moves across the conveyor. In another configuration, the control circuit may access a multi-dimensional positional matrix from a memory to determine a physical location associated with the tote identifier. In one implementation, elements of the multi-dimensional positional matrix may correspond to predetermined physical locations of the plurality of totes within the rack. In another implementation, each element of the multi-dimensional positional matrix may include a lift identifier, a rack identifier, and a shelf identifier. In one configuration, the control circuit may activate the stop mechanism of a particular hydraulic lift of the plurality of hydraulic lifts to position the tote on the top surface of the particular hydraulic lift. By one approach, the particular hydraulic lift may be associated with the lift identifier of an element of the multi-dimensional positional matrix corresponding to the physical location. By another approach, the control circuit may activate the hydraulic system to raise the top surface of the hydraulic lift to a second height of a shelf of the rack based on the physical location. In one configuration, the shelf identifier of the element may be associated with the shelf.

In some embodiments, a method of loading totes onto a plurality of shelves of a plurality of racks inside a delivery vehicle using a plurality of lifts may include accessing a multi-dimensional positional matrix from a memory. In one configuration, elements of the multi-dimensional positional matrix may correspond to predetermined physical locations of a plurality of totes within a rack secured inside a delivery vehicle. In another configuration, each element of the multi-dimensional positional matrix may include a lift identifier, a rack identifier, and a shelf identifier. By one approach, the method may include determining a physical location associated with the tote based at least on the multi-dimensional positional matrix and a tote identifier of the tote. By another approach, the method may include determining a particular hydraulic lift of a plurality of hydraulic lifts based on the physical location. In one implementation, the lift identifier of an element corresponding to the physical location may be associated with the particular hydraulic lift. In another implementation, the method may include activating a stop mechanism of the particular hydraulic lift to position the tote on a top surface of the particular hydraulic lift. In yet another implementation, the method may include operating a hydraulic system of the particular hydraulic lift to move the tote to a height of a shelf of the rack based on the physical location. By one approach, the shelf identifier of an element of the multi-dimensional positional matrix corresponding to the physical location may be associated with the shelf.

As such, apparatuses, systems, and/or methods described herein provide for loading totes on shelves of racks secured inside at least one cargo area of a delivery vehicle (e.g., truck, van, semi-trailer truck, and other such vehicles). In one example, the delivery vehicle includes a locomotion system that moves the delivery truck towards a delivery destination. By one approach, the locomotion system may include transmission system components, engine, and driving wheels. In some embodiments, apparatuses, systems, and/or methods described herein may be applicable to shelves of racks other than those secured inside the delivery truck. Nevertheless, the apparatuses, systems, and/or methods described herein for loading totes on shelves of racks provides for at least an improvement on loading of totes and/or products in a delivery truck. The improvement provides faster loading time, reduction on use of manual labor, increased accuracy, enhanced verification, reduction of workplace injuries, efficient use of available resource, among other effects of automating loading of totes on shelves of racks.

Figure 2:
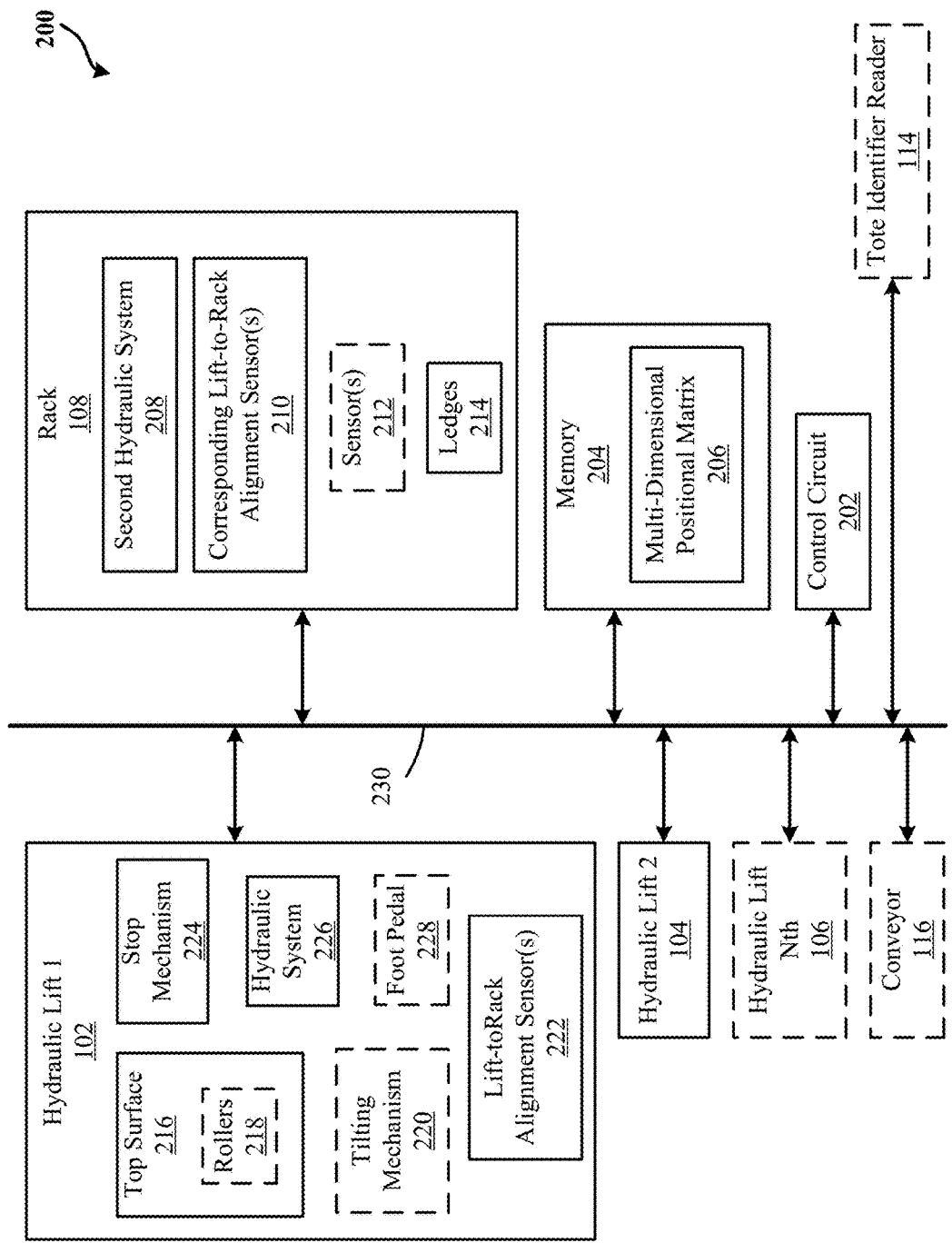
FIG. 2 illustrates a simplified block diagram of an exemplary system for loading totes on shelves of racks using a plurality of hydraulic lifts in accordance with some embodiments.

To illustrate, FIGS. 1 through 5 are described below. FIG. 1 and FIG. 2 are described concurrently to facilitate describing elements in each of the figures. FIG. 1 illustrates a simplified schematic illustration of an exemplary lift and loading system 100 for loading totes 112 on shelves of racks secured inside at least one cargo area of a delivery vehicle in accordance with some embodiments. By one approach, the totes 112 may comprise a box, a container, and a bag, among other types of container adapted to carry one or more retail items. FIG. 2 illustrates a simplified block diagram of the lift and loading system 100 in accordance with some embodiments. The system 100 includes a plurality of hydraulic lifts 102, 104, 106. Each of the plurality of hydraulic lifts 102, 104, 106 is operably coupled to and works collectively with at least another one of the plurality of hydraulic lifts. By one approach, a control circuit 202 is configured to cause the addition at least one additional hydraulic lift and configure the at least one additional hydraulic lift to work collectively with the plurality of hydraulic lifts 102, 104, 106. For example, prior to the addition and configuration, the at least one additional hydraulic lift is a hydraulic lift that is not working cooperatively and/or collectively with the plurality of hydraulic lifts 102, 104, 106. As such, the at least one additional hydraulic lift is not part of the collective plurality of hydraulic lifts 102, 104, 106 that are working cooperatively and/or collectively to automatically load totes 112 into a delivery truck 110, but can be cooperated with one or more hydraulic lifts. Further, the control circuit can be configured to direct the removal of one or more of the hydraulic lifts from the cooperation of hydraulic lifts.

By one approach, to add the at least one additional hydraulic lift to the collective plurality of hydraulic lifts 102, 104, 106, the control circuit 202 may transmit and/or broadcast a control signal. By one approach, in response to receiving the control signal via a transceiver of the at least one additional hydraulic lift, the at least one additional hydraulic lift may send a response signal to the control circuit 202 indicating that the at least one additional hydraulic lift is within a threshold distance from a transceiver associated with the control circuit 202. Alternatively or in addition to, the at least one additional hydraulic lift may send the response signal when the at least one additional hydraulic lift is aligned with the rack 108. As such, the response signal may indicate to the control circuit 202 that the at least one additional hydraulic lift has been added to the collective plurality of hydraulic lifts 102, 104, 106. In one configuration, when, after a period of time after transmitting and/or broadcasting the control signal, the control circuit 202 has not received the response signal from the at least one additional hydraulic lift, the control circuit 202 may determine that there is not an additional hydraulic lift to be added to the collective plurality of hydraulic lifts 102, 104, 106.

By one approach, each of the plurality of hydraulic lifts 102, 104, 106 may include a plurality of wheels and a transport system. In one configuration, the transport system in cooperation with the plurality of wheels may transport the hydraulic lift towards and/or in alignment with the rack 108. In another configuration, each of the plurality of hydraulic lifts 102, 104, 106 may be manually maneuvered, in cooperation with the plurality of wheels and the transport system, by a user towards and/or in alignment with the rack 108.

Each of the plurality of hydraulic lifts 102, 104, 106 may include a hydraulic system 226. Upon activation, the hydraulic system 226 elevates the top surface 216 to move one or more totes 112 to one of multiple different heights that each correspond with a different shelf of a rack system 108 fixed within the delivery vehicle 110. By one approach, the hydraulic system 226 of the first hydraulic lift 102 may be activated by a foot pedal 228. In one configuration, a user may depress the foot pedal 228 to activate the hydraulic system 226 to manually raise and/or lower the top surface 216. In one example, the foot pedal 228 may be used when manual control and/or operation of the hydraulic lift is desired by the user and/or at a time when automatic control and/or operation of the hydraulic lift by the control circuit 202 is not possible (e.g., malfunction of the control circuit 202, loss of communication between the control circuit 202 and one of the plurality of hydraulic lifts 102, 104, 106, among other scenarios where manual operation and/or control of the hydraulic lift is a redundant option for controlling and/or operating one or more of the plurality of hydraulic lifts 102, 104, 106).

By another approach, the control circuit 202 may operate, control, and/or activate the hydraulic system 226. For example, to operate, control, and/or activate the hydraulic system 226, the control circuit 202 may provide control signal to the hydraulic system 226 indicating positional data associated with a particular shelf based on a multi-dimensional positional matrix 206. In one configuration, the first hydraulic lift 102 may include a top surface 216 that may be coupled to the hydraulic system 226. The top surface 216 adapted to provide a surface for the tote 112. By another approach, the top surface 216 may include a plurality of rollers 218 (among other types of mechanism adapted to facilitate movement of the tote 112 from and/or across the top surface 216 to another top surface of a subsequent hydraulic lift) adapted to horizontally move the tote 112 relative to the top surface 216. In one configuration, each of the plurality of rollers 218 of the top surface 216 may be substantially a quarter (¼) inch apart from one another. In another configuration, each of the plurality of hydraulic lifts 102, 104, 106 when placed proximate a distance threshold with another one of the plurality of hydraulic lifts 102, 104, 106 may enable the tote 112 to move across from one hydraulic lift to another hydraulic lift without using an additional conveyor 118. In another configuration, the additional conveyor 118 may be adapted to work cooperatively with the plurality of hydraulic lifts 102, 104, 106 to facilitate the tote's movement across the plurality of hydraulic lifts 102, 104, 106. In yet another configuration, the plurality of hydraulic lifts 102, 104, 106 may comprise scissor lifts and/or post lifts, among other types of lifts. In yet another configuration, the top surface 216 may be portably detachable from the hydraulic system 226 and replaceable with another top surface. For example, the top surface 216 may include a frame and a set of rollers secured with the frame. By one approach, the frame may include one or more mountings (e.g., posts, apertures, latches, etc.) that mate with one or more corresponding mountings on the hydraulic lift. In some embodiments, the frame can be constructed of plastic, aluminum and/or other relatively light weight material while providing sufficient support for the rollers to support at least a threshold weight of the tote 112. In one configuration, the top surface 216 may include at least one motor communicatively coupled to the control circuit 202. In one example, the at least one motor may cause rolling of the set of rollers.

By one approach, the first hydraulic lift 102 may include a stop mechanism 224. The stop mechanism 224 may position the tote 112 upon the top surface 216. By one approach, the stop mechanism 224 may include a surface capable of stopping the movement of the tote 112 across the plurality of hydraulic lifts 102, 104, 106. In one configuration, the stop mechanism 224 may include a stop mechanism motor that may be activated by the control circuit 202 to raise and/or lower the surface capable of stopping the movement of the tote 112 based on the multi-dimensional positional matrix 206. Each of the plurality of hydraulic lifts 102, 104, 106 may include the stop mechanism 224. In one configuration, the stop mechanism 224 may be movably secured to one side of the first hydraulic lift 102. In a non-limiting example, the stop mechanism 224 may be movably secured to a first-side end of the top surface 216 proximate to the second hydraulic lift 104. As such, when the stop mechanism 224 is activated by the control circuit 202, the surface capable of stopping the movement of the tote 112 may extend above a surface of the top surface 216 to stop movement of the tote 112 towards the second hydraulic lift 104. Alternatively or in addition to, the control circuit 202 may deactivate the stop mechanism 224 by lowering the surface capable of stopping the movement of the tote 112 below the surface of the top surface 216. In response, the tote 112 may freely move once again towards the second hydraulic lift 104. By one approach, the set of rollers may be kept on rolling while the tote 112 is held in-place by the stop mechanism 224. Thus, when the stop mechanism 224 is lowered below the surface of the top surface 216, the tote 112 may freely move towards the second hydraulic lift 104. By another approach, once the stop mechanism 224 is lowered below the surface of the top surface 216, the control circuit 202 may send an activate signal to the at least one motor to cause the set of rollers to roll, thus, moving the tote 112 towards the second hydraulic lift 104.

By another approach, the control circuit 202 may determine that the tote 112 has been loaded onto one of a shelf of the plurality of racks 108 based on an absence of weight on the top surface 216. As such, the top surface 216 of the first hydraulic lift 102 may include at least one weight sensor configured to provide weight data to the control circuit 202. In one configuration, the control circuit 202 may send trigger signal to the at least one weight sensor to provide the weight data. In another configuration, the control circuit 202 may determine when to receive the weight data from the at least one weight sensor.

By another approach, the control circuit 202 may receive tote detect data from at least one of sensor(s) 212 of the rack 108 when the tote 112 is loaded onto the shelf of the rack 108. In one implementation, the control circuit 202 may communicatively couple to the sensor(s) 212. In another implementation, one or more of the sensor(s) 212 are secured inside each shelf of the rack 108. Alternatively or in addition to, the sensor(s) 212 may be dispersed in each shelf of the rack 108. By one approach, the sensor(s) 212 of the rack 108 may periodically provide sensor data. In such configuration, the control circuit 202 may determine, based on the sensor data provided by the sensor(s) 212, whether a tote has been loaded on the shelf. In another configuration, the sensor data from the sensor(s) 212 may be provided to the control circuit 202 by a second control circuit and/or a main control circuit associated with the rack 108. In such a configuration, the second control circuit and/or the main control circuit may be separate and/or distinct from the control circuit 202. By another approach, the control circuit 202 may determine whether the shelf of the rack 108 is empty based on the tote detect data of the sensor(s) 212.

In some embodiments, the first hydraulic lift 102 may include at least one lift-to-rack alignment sensor 222 cooperated with at least one corresponding lift-to-rack alignment sensor 210 of the rack 108. In such an embodiment, at least one of the at least one lift-to-rack alignment sensor 222 or at least one corresponding lift-to-rack alignment sensor 210 may include a sensor, an alignment indicator, and/or a sound emitter. The sensor may comprise an optical sensor, radio frequency (RF) sensor, among other type of sensors capable of providing visual clues to a user when aligning the rack 108 with the first hydraulic lift 102. As such, the control circuit 202 may perform data processing of sensor data received from at least one of the at least one lift-to-rack alignment sensor 222 or at least one corresponding lift-to-rack alignment sensor 210 to determine alignment of the rack 108 with the hydraulic lift. By one approach, the control circuit 202 may activate the alignment indicator and/or the sound emitter based on the processed sensor data. In one implementation, the alignment indicator and/or the sound emitter may be proximate to the sensor. In another implementation, the alignment indicator and/or the sound emitter may be placed in an area visible to a user and/or within hearing distance to the user, respectively.

By one approach, the at least one lift-to-rack alignment sensor 222 and/or the at least one corresponding lift-to-rack alignment sensor 210 may provide an indication to the control circuit 202 and/or the user of an alignment of the rack 108 with the first hydraulic lift 102. For example, when the first hydraulic lift 102 is being aligned with the rack 108, one of the at least one corresponding lift-to-rack alignment sensor 210 of the rack 108 and/or the at least one lift-to-rack alignment sensor 222 of the first hydraulic lift 102 may turn to a particular color (e.g., green) when the rack 108 is aligned with the first hydraulic lift 102. Alternatively or in addition to, the at least one corresponding lift-to-rack alignment sensor 210 and/or the at least one lift-to-rack alignment sensor 222 may turn another particular color (e.g., red) when the rack 108 is not aligned with the first hydraulic lift 102. Alternatively or in addition to, the at least one corresponding lift-to-rack alignment sensor 210 and/or the at least one lift-to-rack alignment sensor 222 may not turn to another color when the rack 108 is not aligned with the first hydraulic lift 102. By another approach, the at least one corresponding lift-to-rack alignment sensor 210 and/or the at least one lift-to-rack alignment sensor 222 may not turn to another color when the rack 108 is aligned with the first hydraulic lift 102. By yet another approach, the at least one corresponding lift-to-rack alignment sensor 210 and/or the at least one lift-to-rack alignment sensor 222 may turn to a different color and/or shade of color based on how much aligned the at least one corresponding lift-to-rack alignment sensor 210 relative to the at least one lift-to-rack alignment sensor 222. Alternatively or in addition to, instead of changing color, the at least one corresponding lift-to-rack alignment sensor 210 and/or the at least one lift-to-rack alignment sensor 222 may emit a varying sound and/or loudness of sound based on how much aligned the at least one corresponding lift-to-rack alignment sensor 210 relative to the at least one lift-to-rack alignment sensor 222.

In another configuration, the control circuit 202 may determine rack alignment marks on the rack 108 based on sensor data received from the at least one lift-to-rack alignment sensor 222. By one approach, the control circuit 202 may perform data processing to determine whether the hydraulic lift is aligned with the rack 108 based on the sensor data of the at least one lift-to-rack alignment sensor 222. By another approach, the control circuit 202 may continually receive the sensor data and operate the transport system of the hydraulic lift to align the hydraulic lift with the rack 108 based on the sensor data. In some embodiments, the rack 108 may include one or more shelf alignment marks on each shelf of the rack 108. Similarly, the control circuit 202 may perform data processing of sensor data received from the at least one lift-to-rack alignment sensor 222. By one approach, the control circuit 202 may determine whether the top surface 216 is aligned with a shelf of the rack 108 based on the sensor data received from the at least one lift-to-rack alignment sensor 222. As such, the control circuit 202 may continually receive the sensor data and operate the hydraulic system 226 to align the top surface 216 with the shelf of the rack 108.

In yet another configuration, the first hydraulic lift 102 may include a tilting mechanism 220. By one approach, the tilting mechanism 220 may have a pivoting structure that is coupled to the top surface 216 to tilt the top surface 216 to load the tote 112 onto the shelf of the rack 108. In one configuration, the control circuit 202 may operate and/or control the tilting mechanism 220. In another configuration, the tilting mechanism 220 may include a motor adapted to move the pivoting structure based on a trigger signal from the control circuit 202. The trigger signal may indicate to the tilting mechanism 220 to tilt the top surface 216 forward and/or towards a shelf proximately across the top surface 216.

In some embodiments, the system 100 may include the rack 108. By one approach, the rack 108 may be secured inside the delivery truck 110. In one configuration, the rack 108 includes a plurality of ledges 214 that are vertically distributed along a first height of the rack 108 to form a plurality of shelves. By one approach, each of the plurality of ledges 214 may be movable along the first height of the rack 108. By another approach, each shelf of the plurality of shelves may have a volume to store one or more totes 112. In another configuration, the rack 108 may include a second hydraulic system 208 that may be coupled to a control circuit 202 and the plurality of ledges 214. In one implementation, the control circuit 202 may command and/or operate the second hydraulic system 208 to separately and/or vertically move each of the plurality of ledges 214. In another implementation, the control circuit 202 may command, operate, and/or disengage the second hydraulic system 208 to collapse a particular shelf by lowering a top ledge of the plurality of ledges 214 of the particular shelf onto a bottom ledge of the plurality of ledges 214 of the particular shelf in response to a determination by the control circuit 202 that the particular shelf is empty. In another implementation, the second hydraulic system 208 may lock in response a determination that the particular shelf is not empty.

By one approach, the second hydraulic system 208 may be controlled and/or operable by the control circuit 202, the second control circuit and/or the main control circuit associated with the rack 108. By another approach, the rack 108 may include one or more buttons configured to enable a user to manually control and/or operate the second hydraulic system 208. In one example, a user may, for example, depress, slide and/or switch the one or more buttons to manually control and/or operate the second hydraulic system 208. In another example, each shelf of the rack 108 may be associated with at least one of the one or more buttons. As such, the at least one of the one or more buttons may control and/or operate a corresponding shelf of the rack 108.

In some embodiments, each of the plurality of ledges 214 of the rack 108 may include a shelf sensor including a shelf identifier particular to the shelf. As such, the first hydraulic 102 may include a shelf sensor reader configured to read the shelf identifier. In one example, the top surface 216 may include the shelf sensor reader. Thus, based on the shelf identifier read by the shelf sensor, the control circuit 202 may control and/or operate the hydraulic system 226 to stop moving when the shelf identifier read by the shelf sensor matches the shelf identifier associated with the tote 112 in the multi-dimensional positional matrix 206. Alternatively or in addition to, the control circuit 202 may control and/or operate the hydraulic system 226 to continue moving when the shelf identifier read by the shelf sensor does not match the shelf identifier associated with the tote 112 in the multi-dimensional positional matrix 206.

By one approach, the control circuit 202 may be operably coupled with the plurality of hydraulic lifts 102, 104, 106 via a communication network 230. In one example, the communication network 230 may comprise wired and/or wireless network, among other communication protocols that may be used to provide wired and/or wireless connectivity between two or more devices (e.g., the first hydraulic lift 102 and the control circuit 202, etc.). In another example, the communication network 230 may comprise one or more communication networks. Each one of the one or more communication networks may be based on the same and/or different communication protocols.

In one configuration, the control circuit 202 may access the multi-dimensional positional matrix 206 from a memory 204. In one example, the memory 204 may comprise volatile memory, nonvolatile memory, a local database, a cloud-based database, among other type of devices that may store the multi-dimensional positional matrix 206. Alternatively or in addition to, the main control circuit distinct from the control circuit 202 may provide the multi-dimensional positional matrix 206 to the control circuit 202. By one approach, the multi-dimensional positional matrix 206 may be based on information associated with at least one inventory system and/or distribution system of a retailer and/or a distribution center, and/or order requests from a plurality of customers. By another approach, an associate of the retailer may provide data usable to initiate creation, modification, and/or update of the multi-dimensional positional matrix 206 via the main control circuit and/or the control circuit 202. In an example, the main control circuit and/or the control circuit 202 may be coupled to a display device configured to receive physical input from the associate to initiate creation, modification, and/or update of the multi-dimensional positional matrix 206. In response, for example, the main control circuit may provide the multi-dimensional positional matrix 206 to the control circuit 202. By one approach, the multi-dimensional positional matrix 206 may be stored at the memory 204 for a period of time.

In one configuration, elements of the multi-dimensional positional matrix 206 may correspond to predetermined physical locations of the plurality of totes 112 within the rack 108. For example, the multi-dimensional positional matrix 206 may include the predetermined physical locations of the plurality of totes 112 that are assigned to a loading dock 120. In such an example, the multi-dimensional positional matrix 206 may also include positional information and/or physical location regarding which ones of the plurality of totes 112 are assigned to which delivery trucks positioned to receive totes at the loading dock 120, as well as within which rack the tote is to be placed, on which shelf the tote is to be placed and at which location along the shelf the tote is to be placed. In some embodiments, the multi-dimensional positional matrix 206 is a three-dimensional matrix corresponding to different available positions within a delivery vehicle (e.g., the delivery truck 110) in which a tote may be positioned (e.g., rack 3, shelf 2, tote position 5, etc.).

As such, each element of the multi-dimensional positional matrix 206 may at least include a lift identifier, a rack identifier, and a shelf identifier. In one configuration, the lift identifier may correspond to a particular lift of the plurality of hydraulic lifts 102, 104, 106. For example, the control circuit 202 may determine that the first hydraulic lift 102 correspond to the lift identifier. Thus, the control circuit 202 may determine a particular hydraulic lift of the plurality of hydraulic lifts 102, 104, 106 based on the predetermined physical location. The lift identifier of an element of the multi-dimensional positional matrix 206 may correspond to a physical location associated with the particular hydraulic lift. By one approach, the multi-dimensional positional matrix 206 may include association of which collective set of the plurality of hydraulic lifts 102, 104, 106 is associated with a particular delivery truck 110. Thus, the multi-dimensional positional matrix 206 may include a plurality of associations of hydraulic lifts with racks secured inside the delivery truck 110. By another approach, the multi-dimensional positional matrix 206 may include positional order of the plurality of hydraulic lifts 102, 104, 106 relative to a conveyor 116 and/or relative to positional order of the plurality of racks 108. For example, the multi-dimensional positional matrix 206 may include an indication of a particular order of sequence that the plurality of hydraulic lifts 102, 104, 106 are lined up relative to the plurality of racks 108 secured inside the delivery truck 110. In an illustrative non-limiting example, relative to the conveyor 116, the first hydraulic lift 102 may be associated with a first rack of the plurality of racks 108, the second hydraulic lift 104 may be associated with a second rack of the plurality of racks 108, and/or the Nth hydraulic lift 106 may be associated with a third rack of the plurality of racks 108 in accordance with the plurality of associations in the multi-dimensional positional matrix 206. As such, in some implementations, each hydraulic lift is positioned to align with one of the racks within the delivery vehicle.

In some embodiments, the system 100 may include the conveyor 116 having at least one tote identifier reader 114. By one approach, the conveyor 116 may read tote identifiers of the one or more totes 112 via the at least one tote identifier reader 114 as the one or more totes 112 are prepared to be placed on the conveyor, moves across the conveyor 116 towards the plurality of hydraulic lifts 102, 104, 106, passes one or more readers positioned along the conveyor and/or on one or more hydraulic lifts. By another approach, the control circuit 202 may communicatively couple to the plurality of hydraulic lifts 102, 104, 106, the rack 108, the memory 204, the conveyor 116, and/or the tote identifier reader 114 via the communication network 230. In one example, a tote identifier may correspond to a UPC barcode, RFID tags, text, among other types of identifier capable of providing a particular identification to an item (e.g., the tote 112). Similarly, the one or more identifier readers 114 may be bar code readers, RFID tag readers, cameras and image processing, and/or other such readers to identify the tote and/or one or more products within the tote.

In another configuration, the rack identifier may correspond to a particular rack secured inside the delivery truck 110. In one example, the control circuit 202 may determine the positional order of the plurality of racks 108 based on the particular delivery truck 110. In another example, the multi-dimensional positional matrix 206 may include association of the positional order of the plurality of racks 108 with each of the plurality of delivery trucks 110. In yet another example, the multi-dimensional positional matrix 206 may include a plurality of associations of hydraulic lifts and/or racks with delivery trucks. By one approach, the multi-dimensional positional matrix 206 may be updated based on changes to one or more associations in the multi-dimensional positional matrix 206. For example, the control circuit 202 may determine that the delivery truck 110 is at the loading dock 120 based on input from an associate and/or detection of a particular truck identifier (e.g., license plate). In one configuration, the control circuit 202 may determine a particular collective set of the plurality of hydraulic lifts 102, 104, 106 and/or positional arrangement of each of the plurality of hydraulic lifts 102, 104, 106 relative to the plurality of racks 108. By one approach, the particular collective set and/or the positional arrangement may be based on sequence and/or order of receipt, by the control circuit 202, of the response signal indicating addition of a hydraulic lift to the particular collective set.

In another configuration, the shelf identifier may correspond to a particular shelf of the particular rack. By one approach, the multi-dimensional positional matrix 206 may include association of each one of a plurality of shelf identifiers with each one of the plurality of racks 108. As such, the control circuit 202 may determine which particular shelf is associated with a particular rack and/or a particular position of the particular shelf relative to other shelves in the particular rack based on the multi-dimensional positional matrix 206. As such, the multi-dimensional positional matrix 206 may include physical locations and/or positional information that the control circuit 202 may use to facilitate and/or efficiently load the plurality of totes 112 to the plurality of delivery trucks 110 for delivery to a plurality of destinations associated with each products stored in the plurality of totes 112.

In another configuration, based at least on the multi-dimensional positional matrix 206 and a tote identifier of the tote 112, the control circuit 202 may determine a physical storage location of the tote 112 in the delivery truck 110. For example, the control circuit 202 may access the memory 204 and determine a loading information for the tote 112 based at least on the multi-dimensional positional matrix 206 and a tote identifier of the tote 112. By one approach, the control circuit 202 may access the multi-dimensional positional matrix 206 to determine a lift identifier, a rack identifier, and a shelf identifier associated with the tote identifier of the tote 112. By another approach, the loading information of the tote 112 may be based on a loading sequence of the tote on the conveyor 116. In such an approach, a first of tote of the plurality of totes 112 may be initially loaded onto a bottom-most shelf of farthest rack of the plurality of racks 108 relative to the conveyor 116. As such, the totes 112 may be sequentially loaded starting at the bottom shelf of the rack 108 to the top-most shelf of the rack 108. Thus, based on the association of racks, shelves, hydraulic lifts, tote identifiers, and/or delivery trucks in the multi-dimensional positional matrix 206, the control circuit 202 may determine when to activate the stop mechanism 224 to position one or more totes 112 on the top surface 216 of one of the plurality of hydraulic lifts 102, 104, 106. Alternatively or in addition to, the top surface 216 may include grooves adapted to keep the totes's 112 horizontal orientation aligned relative to the top surface 216 (e.g., the grooves keep the totes 112 from being turned and/or oriented in a way that may keep the tote 112 from being loaded onto a shelf).

For example, the control circuit 202 may activate the stop mechanism 224 to position the tote 112 on the top surface 216 of the first hydraulic lift 102. By one approach, the control circuit 202 may operate the hydraulic system 226 to move the tote 112 to a height of a shelf of the rack 108 based, in part, on information of the physical location of the tote 112 in accordance with the multi-dimensional positional matrix 206. For example, the shelf identifier may be one element of the multi-dimensional positional matrix that corresponds to a physical location associated with a shelf assigned to the tote 112.

In an illustrative non-limiting example, as the tote 112 moves across the conveyor 116, at least one of the tote identifier reader 114 secured, for example, by the conveyor 116, reads the tote identifier associated with the tote 112. As such, the control circuit 202 may identify the tote 112 based on the read tote identifier. By one approach, the control circuit 202 may identify that the tote 112 may be loaded on a particular hydraulic lift (e.g., an Nth hydraulic lift 106) of the plurality of hydraulic lifts 102, 104, 106 based on the multi-dimensional positional matrix 206 and the tote identifier. In response, the stop mechanism 224 associated with the Nth hydraulic lift 106 may be activated by the control circuit 202 to position the tote 112 on the top surface 216 of the Nth hydraulic lift 106. In an example, the Nth hydraulic lift 106 may correspond to a post lift collectively working with the first and second hydraulic lifts corresponding to scissor lifts. By another approach, the control circuit 202 may determine that the tote 112 is positioned on the top surface 216 based on the weight data provided by the at least one weight sensor of the top surface 216. By another approach, based on the access of the control circuit 202 to the multi-dimensional positional matrix 206 and/or identification of the physical location associated with the tote 112, the control circuit 202 may activate and/or operate the hydraulic system 226 to raise the top surface 216, and thus the tote 112, to a height of a shelf of the rack corresponding to the shelf identifier associated with the tote 112. In one configuration, the control circuit 202 may activate and/or operate the tilting mechanism 220 to tilt the top surface 216 towards the shelf and load the tote 112 onto the shelf. Subsequent to the loading of the tote 112, the control circuit 202 may operate the hydraulic system 226 to move the top surface 216 towards an initial position where another tote may be positioned on and/or moved across the top surface 216. In one implementation, the control circuit 202 may determine that the tote 112 is loaded onto the shelf based on the sensor data provided by the sensor(s) 212 of the rack 108. Alternatively or in addition to, the control circuit 202 may determine that the tote 112 is loaded onto the shelf based on the weight data provided by the at least one weight sensor of the top surface 216 indicating absence of weight on the top surface 216. In some embodiments, one or more sensors may be included in the rack 108 and/or the first hydraulic lift 102 to determine by the control circuit 202 that a door of the rack 108 may be open and/or close. By one approach, the control circuit 202, the main control circuit, and/or the second control circuit may be communicatively coupled with the delivery truck 110, for example, to alert a delivery agent associated with the delivery truck 110 that a particular door associated with one of the plurality of racks 108 is open.

Figure 3:
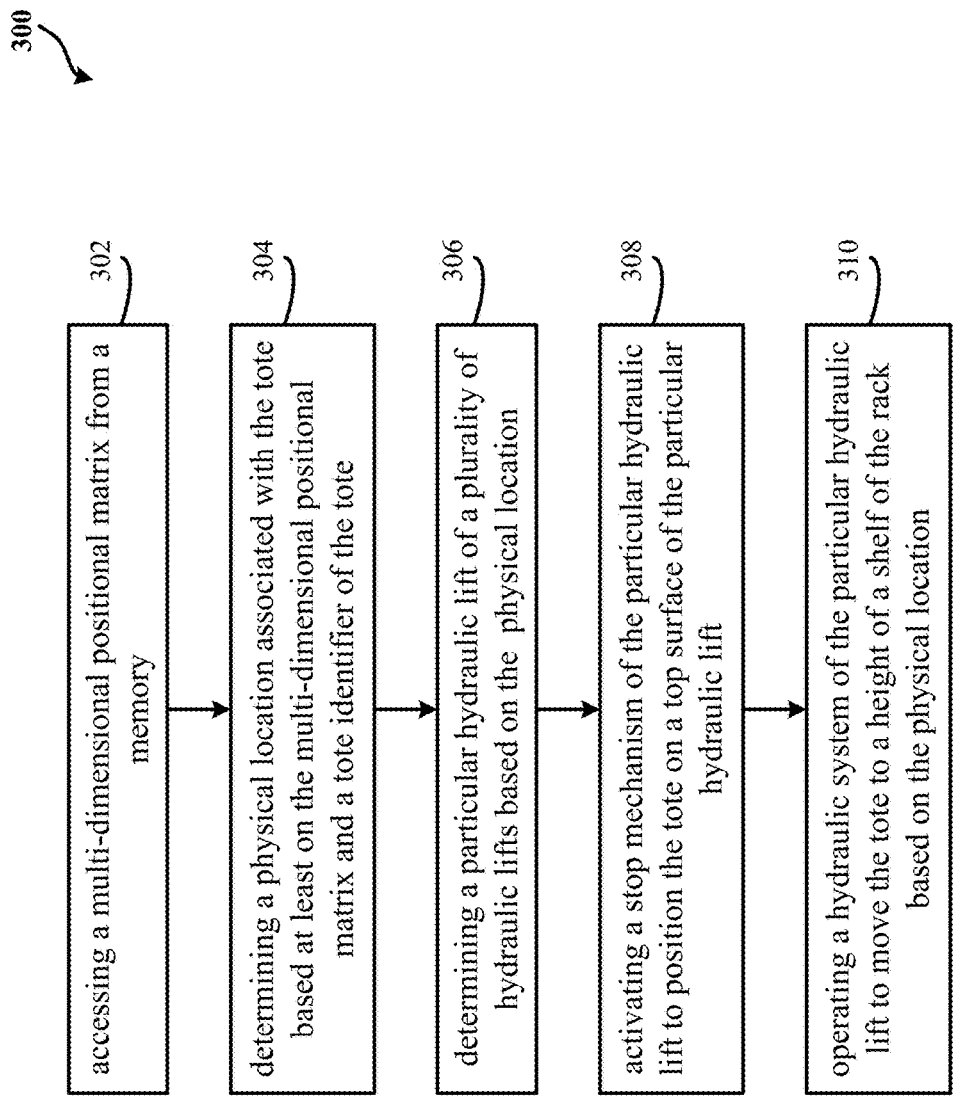
FIG. 3 shows a flow diagram of an exemplary process of loading totes on shelves of racks using a plurality of hydraulic lifts in accordance with some embodiments.

FIG. 3 illustrates a flow diagram of an exemplary process of loading totes on shelves of racks using a plurality of hydraulic lifts in accordance with some embodiments. The exemplary method 300 may be implemented in the system 100 of FIG. 1 and/or the system 100 as illustrated in the simplified block diagram 200 of FIG. 2. The method 300 includes, at step 302, accessing a multi-dimensional positional matrix from a memory. By one approach, elements of the multi-dimensional positional matrix may correspond to predetermined physical locations of a plurality of totes within a rack secured inside a cargo area of a delivery vehicle. By another approach, each element of the multi-dimensional positional matrix may include a lift identifier, a rack identifier, and a shelf identifier. In one configuration, the method 300 may include determining a physical location associated with the tote based at least on the multi-dimensional positional matrix and a tote identifier of the tote, at step 304. In another configuration, the method 300 may include, at step 306, determining a particular hydraulic lift of a plurality of hydraulic lifts based on the physical location. By one approach, the lift identifier of an element corresponding to the physical location may be associated with the particular hydraulic lift. In yet another configuration, the method 300 may include, at step 308, activating a stop mechanism of the particular hydraulic lift to position the tote on a top surface of the particular hydraulic lift. In yet another configuration, the method 300 may include, at step 310, operating a hydraulic system of the particular hydraulic lift to move the tote to a height of a shelf of the rack based on the physical location. By one approach, the shelf identifier of an element of the multi-dimensional positional matrix corresponding to the physical location may be associated with a shelf.

FIG. 4 illustrates a flow diagram of an exemplary process of loading totes on shelves of racks using a plurality of hydraulic lifts in accordance with some embodiments. The exemplary method 400 may be implemented in the system 100 of FIG. 1 and/or the system 100 as illustrated in the simplified block diagram 200 of FIG. 2. By one approach, the method 400 and/or one or more steps of the method may optionally be included in and/or performed in cooperation with the method 300 of FIG. 3. The method 400 includes, at step 402, identifying the tote based on the tote identifier associated with the tote. By one approach, the tote identifier may be read by at least one tote identifier reader of a conveyor while the tote moves across the conveyor. By another approach, the method 400 may include, at step 404, identifying that the tote is to be loaded on the particular hydraulic lift based on the multi-dimensional positional matrix and the tote identifier. In one configuration, the method 400 may include tilting the top surface to load the tote onto the shelf using a tilting mechanism of the particular hydraulic lift, at step 406. In another configuration, the method 400 may include, at step 408, transmitting a control signal to one or more additional hydraulic lifts to operably couple the one or more additional hydraulic lifts with the plurality of hydraulic lifts.

Figure 5:
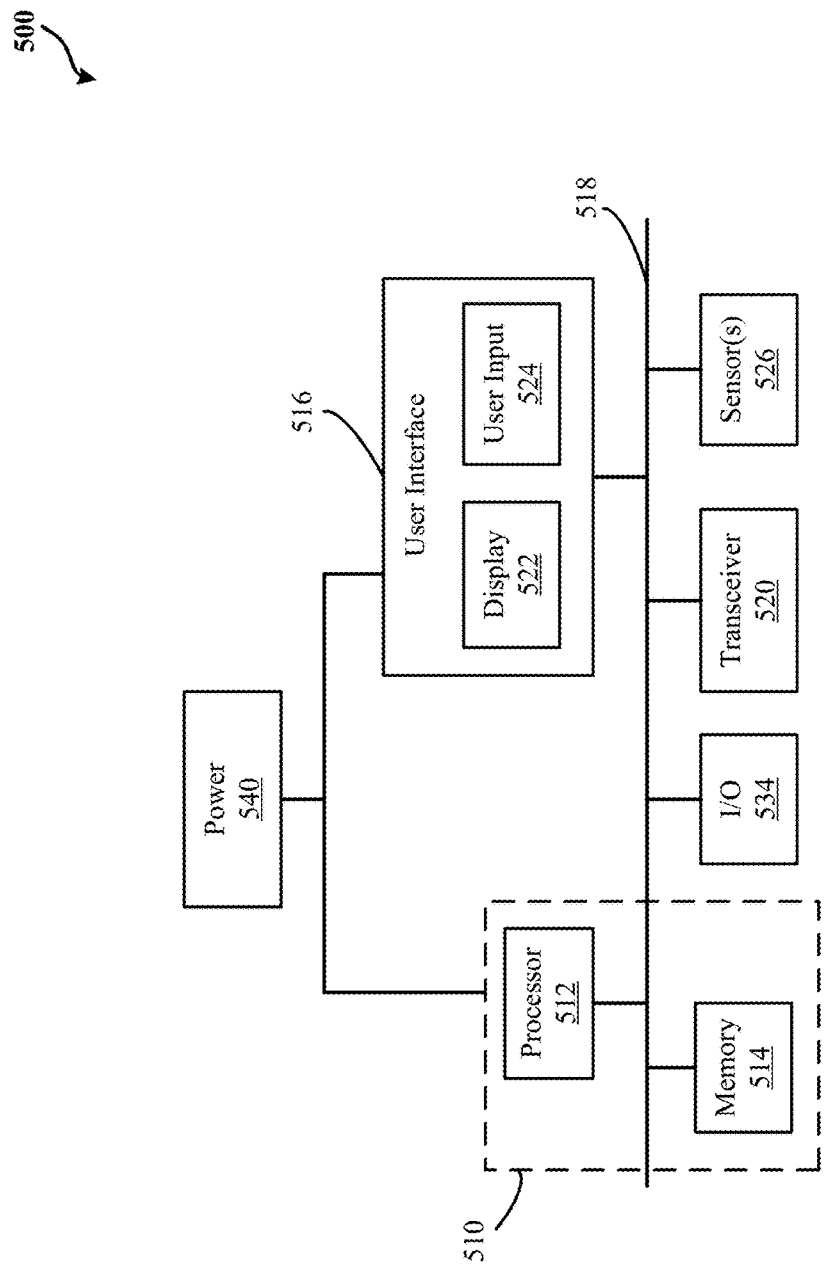
FIG. 5 illustrates an exemplary system for use in implementing methods, techniques, devices, apparatuses, systems, servers, sources and loading totes on shelves of racks using a plurality of hydraulic lifts, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 5 illustrates an exemplary system 500 that may be used for implementing any of the components, circuits, circuitry, systems, functionality, apparatuses, processes, or devices of the system 100 of FIG. 1, the system 100 as illustrated in the simplified block diagram 200 of FIG. 2, the method 300 of FIG. 3, the method 400 of FIG. 4, and/or other above or below mentioned systems or devices, or parts of such circuits, circuitry, functionality, systems, apparatuses, processes, or devices. For example, the system 500 may be used to implement some or all of the system 100 and/or the system 100 as illustrated in the simplified block diagram 200 for loading totes 112 onto a plurality of shelves of a plurality of racks 108 using a plurality of hydraulic lifts 102, 104, 106, the stop mechanism 224, the conveyor 116, the conveyor sensor(s) 114, the hydraulic system 226, the tilting mechanism 220, the alignment sensor(s) 222, the rack hydraulic lift 208, the alignment sensor(s) 210, the tote sensor(s) 212, the memory 204, the control circuit 202, the transceiver, and/or other such components, circuitry, functionality and/or devices. However, the use of the system 500 or any portion thereof is certainly not required.

By way of example, the system 500 may comprise a processor module (or a control circuit) 512, memory 514, and one or more communication links, paths, buses or the like 518. Some embodiments may include one or more user interfaces 516, and/or one or more internal and/or external power sources or supplies 540. The control circuit 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 512 can be part of control circuitry and/or a control system 510, which may be implemented through one or more processors with access to one or more memory 514 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 500 may be used to implement one or more of the above or below, or parts of, components, circuits, systems, processes and the like. For example, the system 500 may implement the system 100 and/or the system 100 as illustrated in the simplified block diagram 200 for loading totes onto a plurality of shelves of a plurality of racks using a plurality of lifts with the control circuit 202 being the control circuit 512.

The user interface 516 can allow a user to interact with the system 500 and receive information through the system. In some instances, the user interface 516 includes a display 522 and/or one or more user inputs 524, such as buttons, touch screen, track ball, keyboard, mouse, etc., which can be part of or wired or wirelessly coupled with the system 500. Typically, the system 500 further includes one or more communication interfaces, ports, transceivers 520 and the like allowing the system 500 to communicate over a communication bus, a distributed computer and/or communication network (e.g., a local area network (LAN), the Internet, wide area network (WAN), etc.), communication link 518, other networks or communication channels with other devices and/or other such communications or combination of two or more of such communication methods. Further the transceiver 520 can be configured for wired, wireless, optical, fiber optical cable, satellite, or other such communication configurations or combinations of two or more of such communications. Some embodiments include one or more input/output (I/O) interface 534 that allow one or more devices to couple with the system 500. The I/O interface can be substantially any relevant port or combinations of ports, such as but not limited to USB, Ethernet, or other such ports. The I/O interface 534 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 526 to provide information to the system and/or sensor information that is communicated to another component, such as the central control system, a portable retail container, a vehicle associated with the portable retail container, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 500 comprises an example of a control and/or processor-based system with the control circuit 512. Again, the control circuit 512 can be implemented through one or more processors, controllers, central processing units, logic, software and the like. Further, in some implementations the control circuit 512 may provide multiprocessor functionality.

The memory 514, which can be accessed by the control circuit 512, typically includes one or more processor readable and/or computer readable media accessed by at least the control circuit 512, and can include volatile and/or nonvolatile media, such as RAM, ROM, EEPROM, flash memory and/or other memory technology. Further, the memory 514 is shown as internal to the control system 510; however, the memory 514 can be internal, external or a combination of internal and external memory. Similarly, some or all of the memory 514 can be internal, external or a combination of internal and external memory of the control circuit 512. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 514 can store code, software, executables, scripts, data, content, lists, programming, programs, log or history data, user information, customer information, product information, and the like. While FIG. 5 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A delivery vehicle loading apparatus using a plurality of hydraulic lifts comprising:

a delivery truck having a cargo area and comprising a locomotion system configured to move the delivery truck;

a plurality of hydraulic lifts, wherein each of the plurality of hydraulic lifts is operably coupled to and works collectively with other one of the plurality of hydraulic lifts, each of the plurality of hydraulic lifts comprises:

a hydraulic system configured to move a tote of the plurality of totes relative to a rack secured inside the cargo area of the delivery truck;

a top surface coupled to the hydraulic system, the top surface adapted to provide a surface for the tote;

a stop mechanism to stop the tote within the top surface; and at least one lift-to-rack alignment sensor cooperated with at least one corresponding lift-to-rack alignment sensor of the rack to provide an indication of an alignment of the rack with the hydraulic lift; and a control circuit operably coupled with the plurality of hydraulic lifts and configured to:

access a multi-dimensional positional matrix from a memory, wherein elements of the multi-dimensional positional matrix correspond to predetermined physical locations of the plurality of totes within the rack, wherein each element of the multi-dimensional positional matrix comprises a lift identifier, a rack identifier, and a shelf identifier;

determine a physical location associated with the tote based at least on the multi-dimensional positional matrix and a tote identifier of the tote;

determine a particular hydraulic lift of the plurality of hydraulic lifts based on the physical location, wherein the lift identifier of an element corresponding to the physical location is associated with the particular hydraulic lift;

activate the stop mechanism to position the tote on the top surface of the particular hydraulic lift; and operate the hydraulic system to move the tote to a height of a shelf of the rack based on the physical location, wherein the shelf identifier of the element is associated with the shelf.

2. The loading apparatus of claim 1, wherein the top surface of the hydraulic lift comprises a plurality of rollers adapted to horizontally move the tote relative to the top surface, and wherein each of the plurality of rollers is substantially a quarter (¼) inch apart from one another.

3. The loading apparatus of claim 2, wherein the top surface is portably detachable from the hydraulic system and replaceable with another top surface.

4. The loading apparatus of claim 1, wherein the hydraulic system of the particular hydraulic lift is further configured to be activated by a foot pedal.

5. The loading apparatus of claim 1, wherein each of the plurality of hydraulic lifts further comprises a tilting mechanism having a pivoting structure that is coupled to the top surface to tilt the top surface to load the tote onto the shelf.

6. The loading apparatus of claim 1, wherein the control circuit is configured to communicatively couple one or more additional hydraulic lifts with the plurality of hydraulic lifts by transmission of control signal to the one or more additional hydraulic lifts.

7. A system for loading totes on shelves of racks secured inside a delivery truck comprising:

a delivery truck having a cargo area and comprising a locomotion system configured to move the delivery truck;

a plurality of hydraulic lifts, wherein each of the plurality of hydraulic lifts comprises:
  a hydraulic system configured to move a tote of one or more totes relative to a first height of a rack secured inside the cargo area of the delivery truck;
  a top surface coupled to the hydraulic system, the top surface adapted to provide a surface for the tote;
  a stop mechanism to position the tote upon the top surface; and
  at least one lift-to-rack alignment sensor cooperated with at least one corresponding lift-to-rack alignment sensor of the rack to provide an indication of an alignment of the rack with the hydraulic lift;
a conveyor having at least one tote identifier reader, the conveyor configured to move the one or more totes towards the plurality of hydraulic lifts; and
a control circuit coupled to the conveyor and the plurality of hydraulic lifts, the control circuit configured to:
  identify the tote based on a tote identifier associated with the tote, wherein the tote identifier is read by the at least one tote identifier reader while the tote moves across the conveyor;
  access a multi-dimensional positional matrix from a memory to determine a physical location associated with the tote identifier, wherein elements of the multi-dimensional positional matrix correspond to predetermined physical locations of the plurality of totes within the rack, and wherein each element of the multi-dimensional positional matrix comprises a lift identifier, a rack identifier, and a shelf identifier;
  activate the stop mechanism of a particular hydraulic lift of the plurality of hydraulic lifts to position the tote on the top surface of the particular hydraulic lift, wherein the particular hydraulic lift is associated with the lift identifier of an element of the multi-dimensional positional matrix corresponding to the physical location; and
  activate the hydraulic system to raise the top surface of the hydraulic lift to a second height of a shelf of the rack based on the physical location, wherein the shelf identifier of the element is associated with the shelf.

8. The system of claim 7, further comprising the rack secured inside the cargo area of the delivery truck, the rack comprising:
  the at least one corresponding lift-to-rack alignment sensor cooperatively coupled with the at least one lift-to-rack alignment sensor of the hydraulic lift to provide indication of the alignment of the rack with the hydraulic lift;
  a plurality of ledges that are vertically distributed along the first height of the rack to form a plurality of shelves of the rack, wherein each of the plurality of ledges is movable along the first height of the rack, and wherein each shelf of the plurality of shelves has a volume to store the one or more totes; and
  a second hydraulic system coupled to the control circuit and the plurality of ledges, wherein the second hydraulic system is configured to separately and vertically move each of the plurality of ledges.

9. The system of claim 8, wherein the rack secured inside the cargo area of the delivery truck further comprises a plurality of sensors dispersed in each shelf and secured on at least one side of the rack, and wherein the control circuit is further configured to determine whether a particular shelf of the plurality of shelves is empty based on sensor data of the plurality of sensors.

10. The system of claim 9, wherein the control circuit is further configured to disengage the second hydraulic system to collapse the particular shelf by lowering a top ledge of the plurality of ledges of the particular shelf onto a bottom ledge of the plurality of ledges of the particular shelf in response to the determination by the control circuit that the shelf is empty.

11. A method of loading totes onto a plurality of shelves of a plurality of racks secured inside a cargo area of a delivery vehicle using a plurality of lifts comprising:
  aligning one or more lift-to-rack alignment sensors of a plurality of hydraulic lifts with one or more corresponding lift-to-rack alignment sensors of one or more racks secured inside a cargo area of a delivery vehicle to provide an indication of an alignment of the one or more racks with the plurality of hydraulic lifts;
  accessing a multi-dimensional positional matrix from a memory, wherein elements of the multi-dimensional positional matrix correspond to predetermined physical locations of a plurality of totes within a rack of the one or more racks secured inside the cargo area of the delivery vehicle, and wherein each element of the multi-dimensional positional matrix comprises a lift identifier, a rack identifier, and a shelf identifier;
  determining a physical location associated with a tote of the plurality of totes based at least on the multi-dimensional positional matrix and a tote identifier of the tote;
  determining a particular hydraulic lift of the plurality of hydraulic lifts based on the physical location, wherein the lift identifier of an element corresponding to the physical location is associated with the particular hydraulic lift;
  activating a stop mechanism of the particular hydraulic lift to position the tote on a top surface of the particular hydraulic lift; and
  operating a hydraulic system of the particular hydraulic lift to move the tote to a height of a shelf of the rack based on the physical location, wherein the shelf identifier of an element of the multi-dimensional positional matrix corresponding to the physical location is associated with the shelf.

12. The method of claim 11, further comprising:
  identifying the tote based on the tote identifier associated with the tote, wherein the tote identifier is read by at least one tote identifier reader of a conveyor while the tote moves across the conveyor; and
  identifying, based on the multi-dimensional positional matrix and the tote identifier, that the tote is to be loaded on the particular hydraulic lift.

13. The method of claim 11, further comprising tilting the top surface to load the tote onto the shelf using a tilting mechanism of the particular hydraulic lift.

14. The method of claim 11, further comprising transmitting a control signal to one or more additional hydraulic lifts to operably couple the one or more additional hydraulic lifts with the plurality of hydraulic lifts.

15. The method of claim 11, wherein the top surface of the hydraulic lift comprises a plurality of rollers adapted to horizontally move the tote relative to the top surface, and wherein each of the plurality of rollers is substantially a quarter ($1/4$) inch apart from one another.

16. The method of claim 15, wherein the top surface is portably detachable from the hydraulic system and replaceable with another top surface.

* * * * *